No. 855,193. PATENTED MAY 28, 1907.
H. C. LYLE.
CLUTCH MECHANISM.
APPLICATION FILED OCT. 29, 1906.
2 SHEETS—SHEET 1.
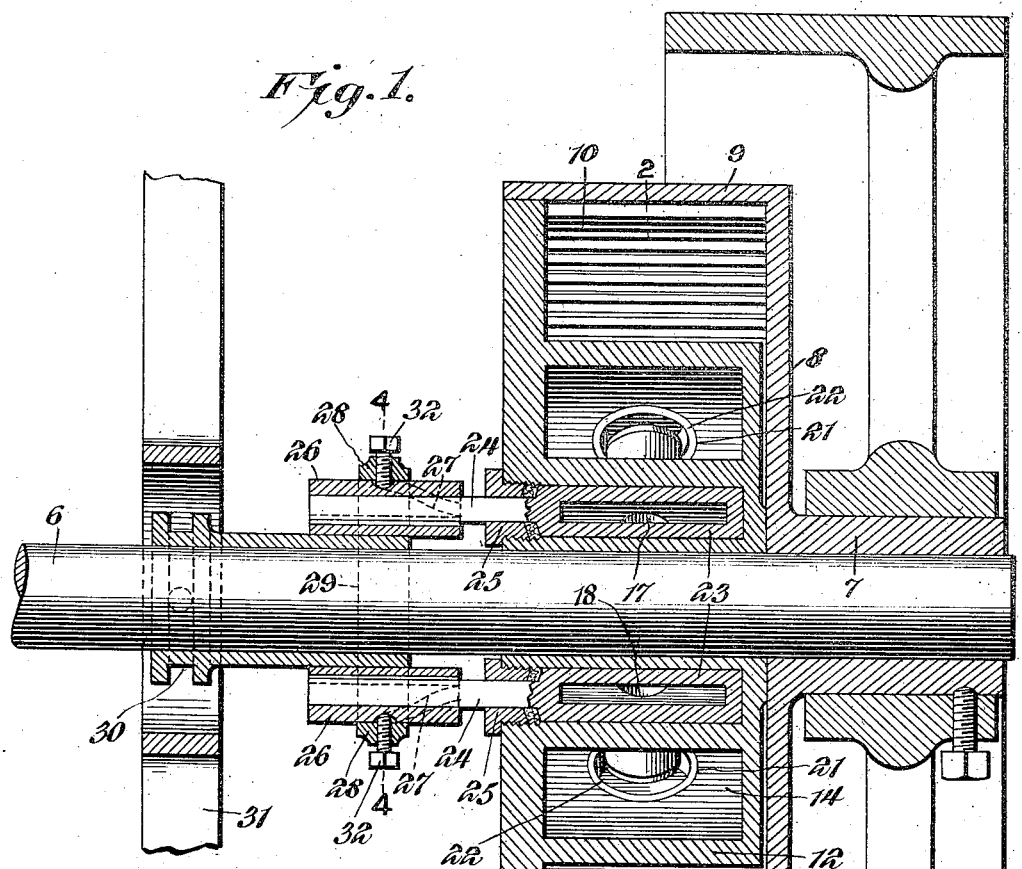
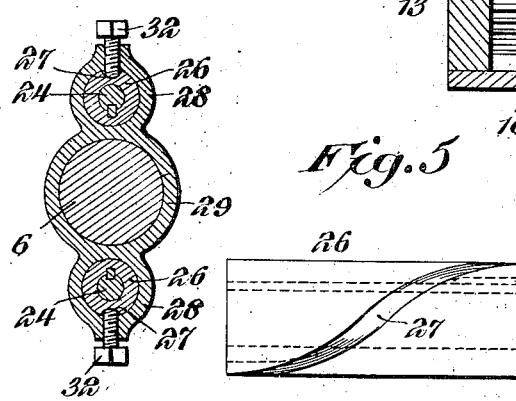
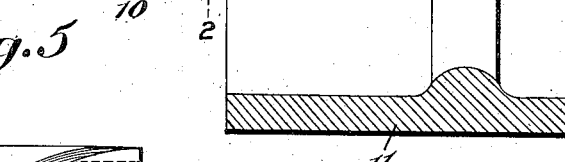
Witnesses
Howard D. Orr
B. G. Foster
H. C. Lyle, Inventor,
By E. G. Siggers,
Attorney No. 855,193. PATENTED MAY 28, 1907.
H. C. LYLE.
CLUTCH MECHANISM.
APPLICATION FILED OCT. 29, 1906.

2 SHEETS—SHEET 2.

Witnesses
Howard D. Orr
B. G. Foster

H. C. Lyle, Inventor,
By C. G. Siggers,
Attorney

UNITED STATES PATENT OFFICE.

HENRY CLAUDE LYLE, OF CHATTANOOGA, TENNESSEE, ASSIGNOR OF ONE-HALF TO SAMUEL V. WEEKS, OF CHATTANOOGA, TENNESSEE.

CLUTCH MECHANISM.

No. 855,193.        Specification of Letters Patent.        Patented May 28, 1907.

Application filed October 29, 1906. Serial No. 341,061.

*To all whom it may concern:*

Be it known that I, HENRY CLAUDE LYLE, a citizen of the United States, residing at Chattanooga, in the county of Hamilton and State of Tennessee, have invented a new and useful Clutch Mechanism, of which the following is a specification.

This invention relates to improvements in means for clutching together relatively movable members, as for instance, relatively rotatable driving and driven parts of a power operated machine, and the object is to provide a novel and comparatively simple structure, whereby such members can be gradually clutched and unclutched so that they may be entirely free to relatively move, may be effectively held against relative movement, and the driven member can be made to operate at varying rates of speed, said mechanism moreover eliminating all shocks and jars to the parts during the clutching and unclutching action, and avoiding lateral strains upon the members.

The preferred form of construction is illustrated in the accompanying drawings, wherein:—

Figure 2:
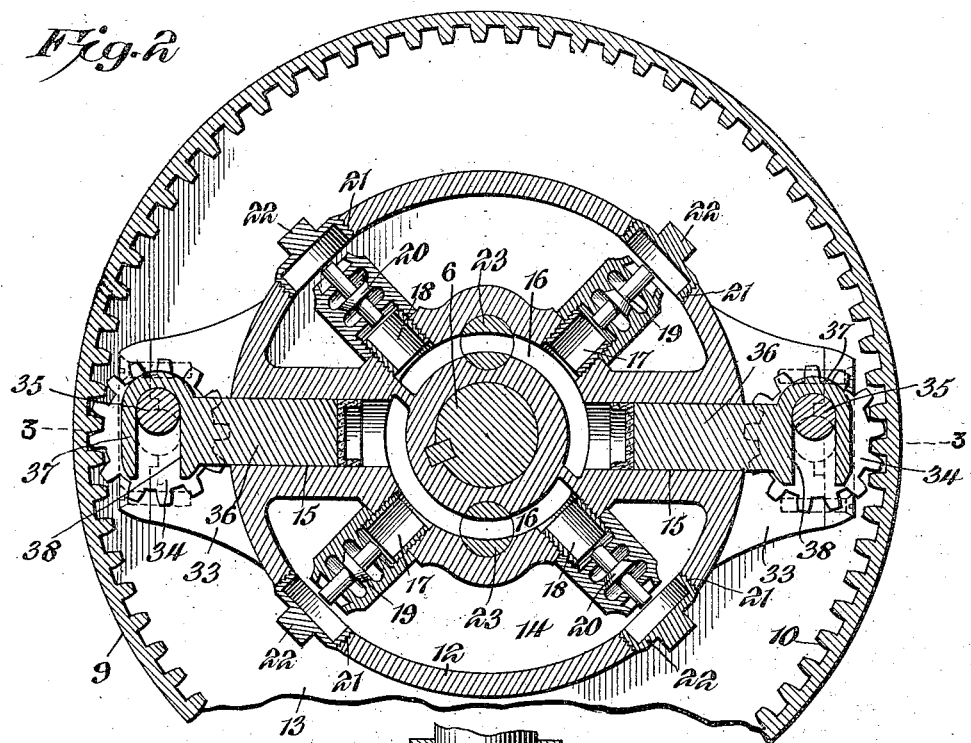
Figure 3:
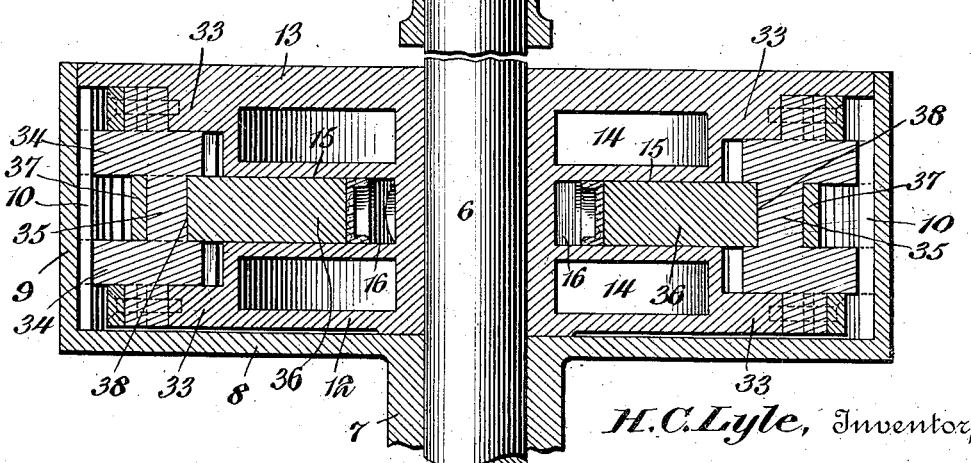

Figure 1 is a longitudinal sectional view through the same. Fig. 2 is a cross sectional view on the line 2—2 of Fig. 1. Fig. 3 is a horizontal sectional view on the line 3—3 of Fig. 2. Fig. 4 is a detail sectional view on the line 4—4 of Fig. 1. Fig. 5 is a detail view of one of the valve stem bushings.

Similar reference numerals designate corresponding parts in all the figures of the drawings.

In the particular embodiment disclosed, a shaft 6 is employed, on which is loosely mounted a sleeve 7 carrying a casing provided with a side wall 8, and an annular wall 9, said casing having an open side. The annular wall 9 of the casing is provided with an internal toothed gear track or guide 10. A pulley 11 or other device is secured to the sleeve 7. It will thus be evident that the shaft and pulley are relatively rotatable, and so far as the invention is concerned, either may be the driving member, in which case, the other of course is the driven member.

Suitably fixed to the shaft 6 and located within the casing, is a support 12 having a side wall 13 that closes the open side of the casing. This support is hollow, thereby forming a chamber or reservoir 14 for fluid. Cylinders 15 are formed in the support, and are preferably disposed diametrically opposite to each other. The cylinders communicate at their inner ends with conduits 16, also formed in the support and communicating with outstanding nipples 17 and 18, said nipples opening into the reservoir. One of the nipples of each set is provided with an inwardly opening valve 19, while the other nipple of each set has an outwardly opening valve 20. Thus each conduit is provided with a valved inlet and a valved discharge, and both are located on the said side of the piston, with which the associated conduit communicates. Access to the nipples and valves is secured through openings 21 formed in the annular wall of the support, and normally closed by suitable plugs 22.

A rotatable controlling valve 23 is arranged in each conduit between its inlet and outlet, and these controlling valves have stems 24 that project from the casing longitudinally of and on opposite sides of the shaft 6, said stems passing through suitable stuffing boxes 25. The exposed ends of the stems carry bushings 26 that are provided with curved slots 27. These bushings are received in the eyes 28 of a sleeve 29 that is slidable longitudinally of the shaft 6, and is provided with an annular groove 30, engaged by a suitable shifting lever 31. Set screws 32, threaded through the outer portions of the eyes 28, have their inner ends slidably engaged in the curved slots 27.

On opposite sides of the outer ends of the cylinders 15 of the support are outstanding ears 33, and journaled in said ears are sets of spaced gear wheels 34 that mesh with the gear track or guide 10. The gear wheels of each set are connected by a crank 35. Pistons 36 are mounted to reciprocate in the cylinders 15, said pistons projecting from the outer ends of the cylinders and having hooks 37 at their outer ends, which hooks thus form transverse slots 38 that receive the cranks 37.

In practice, the reservoir 14 is supplied with a suitable fluid, preferably a comparatively heavy oil. If now the controlling valves 23 are turned so that the conduits 16 between the inlets and outlets are fully open, and power is applied either to the shaft or the pulley, it will be evident that these members can relatively rotate, for the gear wheels 34 will be revolved by their engagement with the gear track, the pistons 36 will be reciprocated, and the fluid will be drawn from the reservoir through the inlet nipples 17, and discharged through the outlet nipples 18 back into said reservoir. If, however, the controlling lever 31 is shifted, the sleeve 29 will be moved longitudinally of the shaft. This will cause the screws 32 to operate in the slots 27 of the bushings 26. As a result, the stems 24 and consequently the valves 23 will be turned, reducing the cross sectional area of the conduits 16 between the inlets and outlets. Resistance will thereby be offered to the movements of the pistons 36, and through the same to the rotation of the gear wheels, and this resistance can be gradually increased until communication between the inlet and outlet nipples through the conduits is entirely cut off. In this condition the pistons cannot reciprocate and therefore the gear wheels will be held against rotation, and consequently it will be evident that the relatively rotatable members will be held against their relative movement, and must operate together. Thus, it will be evident that by changing the positions of the controlling valves 23, the driven member can be operated at various speeds with respect to the driving member. The two may be made to rotate together, or the driving member can be operated without effecting the movement of the driven member. Furthermore, it will be seen that the clutching action may be made gradual so as to avoid all shocks and jars to the parts. It is also desired to call attention to the equidistant arrangement of the piston and cylinder elements. This is important, for the reason that when resistance is offered to the movement of the pistons, the pressure will of course be outwardly, and sufficient play is allowed ordinarily in the bearings of the gear wheels to permit this pressure to be exerted against the casing wall 9, but as it is equal in opposite directions, there is no lateral strain upon the parts.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sarificing any of the advantages of the invention.

Having thus fully described my invention, what I claim as new, and desire to secure by Letters Patent, is:—

1. In mechanism of the class described, the combination with relatively movable members, one of which is provided with a track or guide, of a pump, an operating device for the pump connected thereto and rotatably mounted on the other member, said device revolving against said track or guide upon the relative movement of the members, and means for controlling the passage of fluid through the pump and thus resisting the revolution of the device against said track or guide to resist the relative movement of the members.

2. In mechanism of the class described, the combination with relatively movable members, one of which is provided with a toothed track or guide, of a gear wheel rotatably mounted on the other member, said gear wheel meshing with the teeth of and revolving against the track or guide, a pump mounted on the member having the gear wheel and having operative connections with said wheel, and means for controlling the passage of fluid through the pump, and thus affording resistance to the rotation of the wheel to thereby resist the relative movement of the members.

3. In mechanism of the class described, the combination with a casing having an internal gear track, of a relatively movable support located within the casing, a gear wheel journaled on the support and meshing with the gear track, a pump, a crank connection between the pump and gear wheel, and means mounted on the support for affording a variable resistance to the passage of material through the pump.

4. In mechanism of the class described, the combination with relatively movable members, one of which is provided with a track or guide, of a device rotatably mounted on the other member and engaging the track or guide, relatively movable piston and cylinder elements mounted on the latter member, one of said members being connected to the rotatable device, means for admitting fluid to and discharging it from the cylinder element, and means for controlling the passage of fluid therethrough.

5. In mechanism of the class described, the combination with relatively rotatable members, one of which is provided with an annular track or guide, of a device rotatably mounted on the other member and revolving against the track or guide, relatively movable piston and cylinder elements mounted on the latter member, one of the elements being connected to the rotatable device, means for admitting fluid to and exhausting it from the cylinder element, and means for controlling the passage of the fluid therethrough.

6. In mechanism of the class described, the combination with relatively movable members, one of which is provided with a gear track or guide, of a gear wheel rotatably mounted on the other member and meshing with the teeth of the track or guide, relatively movable piston and cylinder elements mounted on the latter member, one of said elements having a crank connection with the gear wheel, means for admitting fluid to and exhausting it from the cylinder element, and means for controlling the passage of fluid therethrough.

7. In mechanism of the class described, the combination with relatively movable members, one of which is provided with an annular toothed track or guide, of a gear wheel rotatably mounted and revoluble with the other member, said gear wheel meshing with the teeth of the track or guide, relatively reciprocatory piston and cylinder elements mounted on the member carrying the gear wheel, one of said elements having a crank connection with the gear wheel, means for admitting fluid to and exhausting it from the cylinder element, and means for controlling the passage of fluid therethrough.

8. In mechanism of the class described, the combination with a casing having an internal gear track or guide, of a relatively rotatable support mounted within the casing, a gear wheel journaled on the support and meshing with the gear track, said gear wheel having a crank, a cylinder element carried by the support, a reciprocating piston operating therein and connected to the crank of the gear wheel, means for admitting fluid to and exhausting it from the cylinder, and a valve for controlling the passage of fluid therethrough.

9. In mechanism of the class described, the combination with a casing having a circular gear track, of a relatively rotatable support having spaced ears, spaced gear wheels journaled on the ears and meshing with the track, a crank connecting the gear wheels, a cylinder element carried by the support, a piston operating in the cylinder element and having a connection with the crank, means for admitting fluid to and exhausting it from the cylinder element, and a manually operated valve for controlling the passage of fluid therethrough.

10. In mechanism of the class described, the combination with a casing, having an internal gear wheel, of a relatively rotatable support located within the casing, a plurality of gear wheels journaled on the support and meshing with the track, pump mechanism mounted on the support and operated by the gear wheels, and means for obstructing the flow of material through the pump mechanism and thereby imparting resistance to the rotation of the gear wheels.

11. In mechanism of the class described, the combination with a casing having an internal gear track, of a relatively rotatable support located within the casing, a plurality of gear wheels journaled on the support and meshing with the track, a plurality of sets of plunger and cylinder elements, one element of each set being connected to one of the gear wheels eccentrically of its axis of rotation, and means for controlling the supply and discharge of the cylinder elements.

12. In mechanism of the class described, the combination with relatively rotatable members, of a pump carried by one member and comprising relatively movable piston and cylinder elements, actuating means for the pump associated with the other member, a conduit connected at one end to the cylinder element and having a valved inlet and discharge, both of which are located at one side of the cylinder element, and a controlling valve for varying the area of the conduit, said valve being located in the conduit between the inlet and discharge.

13. In mechanism of the class described the combination with relative rotatable members, one of which is provided with a fluid reservoir, of a pump carried by said member and comprising relatively reciprocatory piston and cylinder elements, actuating means for the pump associated with the other member, a conduit connected at one end to the cylinder element and having a valved inlet and discharge, both of which are disposed at one side of said cylinder element and communicating with the reservoir, a rotatable controlling valve located in the conduit between the inlet and discharge, and means for rotating the valve while the members are rotating.

14. In mechanism of the class described, the combination with relatively rotatable members, of a plurality of pump mechanisms carried by one member and operated by the other on their relative rotation, a plurality of rotatable controlling valves for affording resistance to the movement of the fluid acted on by the pump mechanism, said valves having stems extending longitudinally of and on different sides of the axis of rotation of the members and having curved slots, and means for rotating the controlling valves, said means including a sleeve mounted on one of the members and movable longitudinally of its axis of rotation, eyes carried by different portions of the sleeve and sliding upon the valve stems, projections carried by the eyes and engaging in the slots of said stems, and means for moving the sleeve.

15. In mechanism of the class described, the combination with a shaft, of a casing loosely journaled thereon and having an internal gear track, a support fixed to the shaft within the casing and having a fluid reservoir therein, cylinders carried by the support, a conduit communicating with the cylinders and having valved inlet and outlets that communicate with the reservoir, rotatable valves located in the conduit and having exposed stems disposed longitudinally of the shafts and provided with curved slots, a sleeve slidable on the shaft and having sockets that receive the stems, pins carried by the sleeve and engaging in the slots, sets of spaced gear wheels journaled in the support and meshing with the internal gear track of the casing, a crank connecting the gear wheels on each set, and pistons operating in the cylinders and having hooks that engage the crank.

In testimony, that I claim the foregoing as my own, I have hereto affixed my signature in the presence of two witnesses.

HENRY CLAUDE LYLE.

Witnesses:
MAX MILLIGAN,
D. H. RAINS.